United States Patent
Jung et al.

(10) Patent No.: US 10,439,172 B2
(45) Date of Patent: Oct. 8, 2019

(54) COIN CELL BATTERY ANALYZED WITH IN-SITU X-RAY ANALYSIS, METHOD OF MANUFACTURING THE SAME, AND METHOD OF ANALYZING THE SAME USING X-RAY

(71) Applicant: Samsung Electronics Co., Ltd., Suwon-si, Gyeonggi-do (KR)

(72) Inventors: Changhoon Jung, Seoul (KR); Kihong Kim, Asan-si (KR); Woosung Jeon, Suwon-si (KR); Heechul Jung, Gunpo-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 394 days.

(21) Appl. No.: 14/614,520

(22) Filed: Feb. 5, 2015

(65) Prior Publication Data
US 2016/0036011 A1 Feb. 4, 2016

(30) Foreign Application Priority Data

Jul. 29, 2014 (KR) ........................ 10-2014-0096771

(51) Int. Cl.
| | |
|---|---|
| *H01M 2/02* | (2006.01) |
| *H01M 2/04* | (2006.01) |
| *H01M 10/0525* | (2010.01) |
| *H01M 10/058* | (2010.01) |
| *H01M 10/48* | (2006.01) |
| *H01M 4/134* | (2010.01) |
| *H01M 4/66* | (2006.01) |

(52) U.S. Cl.
CPC ....... *H01M 2/0222* (2013.01); *H01M 2/0465* (2013.01); *H01M 10/058* (2013.01); *H01M 10/0525* (2013.01); *H01M 10/48* (2013.01); *H01M 4/134* (2013.01); *H01M 4/661* (2013.01)

(58) Field of Classification Search
CPC ... H01M 2/0222; H01M 2/0465; H01M 10/48
See application file for complete search history.

(56) References Cited

U.S. PATENT DOCUMENTS

| | | | |
|---|---|---|---|
| 5,635,138 A | 6/1997 | Amatucci et al. | |
| 7,022,290 B2 | 4/2006 | Gural et al. | |
| 2005/0191547 A1* | 9/2005 | Konishiike | H01M 2/0222 429/137 |

(Continued)

FOREIGN PATENT DOCUMENTS

| | | |
|---|---|---|
| CN | 001844947 A | 10/2006 |
| KR | 101274730 B1 | 6/2013 |

OTHER PUBLICATIONS

M. Balasubramanian, X. Sun, X.Q. Yang, J. McBreen, In situ X-ray diffraction and X-ray absorption studies of high-rate lithium-ion bateries, 2001, Journal of Power Sources, 92.*

(Continued)

*Primary Examiner* — Sarah A. Slifka
*Assistant Examiner* — Brian R Ohara
(74) *Attorney, Agent, or Firm* — Cantor Colburn LLP (57) ABSTRACT

An in-situ X-ray analyzed coin cell battery includes a case, a cap combined with the case, and an energy storage member provided between the case and the cap. A hole through which an X-ray is irradiated is defined in at least one of the case and the cap.

9 Claims, 7 Drawing Sheets (56) References Cited

U.S. PATENT DOCUMENTS

2011/0059355 A1* 3/2011 Zhang .................. H01M 4/8647
  429/188
2015/0318555 A1* 11/2015 Oku ...................... H01M 4/661
  429/245

OTHER PUBLICATIONS

Chao, Sung-Chieh, In Situ Transmission X-ray Microscopy Study on Working SnO Anode Particle of Li-Ion Batteries, 2011, Journal of the Electrochemical Society (Year: 2011).*
Definitions of exposed (Year: 2018).*
Polyimide-Kapton-Electronic Film (Year: 2018).*
Definitions (Year: 2018).*
Rhodes et al., "Evolution of Phase Transformation Behavior in Li(Mn1.5Ni0.5)O4 Cathodes Studied by In Situ XRD", Journal of the Electrochemical Society, 158(8), 2011, pp. A890-A897.

* cited by examiner

COIN CELL BATTERY ANALYZED WITH IN-SITU X-RAY ANALYSIS, METHOD OF MANUFACTURING THE SAME, AND METHOD OF ANALYZING THE SAME USING X-RAY

CROSS-REFERENCE TO RELATED APPLICATIONS

This application claims priority to Korean Patent Application No. 10-2014-096771, filed on Jul. 29, 2014, and all the benefits accruing therefrom under 35 U.S.C. § 119, the disclosure of which is incorporated herein in its entirety by reference.

BACKGROUND

1. Field

Provided are batteries which are in-situ analyzed to determine a state change of an electrode material according to charging and discharging of a battery in which the electrode material is disposed. More particularly, provided is a coin cell battery for which in-situ X-ray analysis is performed, a method of manufacturing the same, and a method of analyzing the same using X-ray.

2. Description of the Related Art

A lithium ion battery ("LIB") is used as a main power supply source for mobile electronic devices due to high energy density and design ease thereof. The application range of LIBs has expanded to electric cars and power storage devices which store energy generated by using new technologies. In order to meet the market demand for such LIBs, studies have been actively conducted with respect to LIB materials having relatively high energy density and long lifetime.

SUMMARY

Regarding the materials used for lithium ion batteries ("LIBs"), graphite and lithium cobalt oxide have been respectively commercialized as a cathode material and an anode material. For an anode material, such as an alloy carbon complex cathode material or lithium and manganese-rich layered oxide materials having high capacity and high energy density, commercialization has not started because structural stability during continuous separation-binding of lithium has not yet been achieved. Therefore, there remains a need for improved stability of a battery structure including lithium material therein.

Provided are coin cell batteries which are analyzed in-situ with X-ray analysis (and which may hereinafter be referred to as "in-situ coin cells"), such that results of the analysis are provided with relatively high reliability so that the analysis can be applied to batteries in actual use or during use thereof (e.g., in-situ).

Provided are methods of manufacturing the in-situ coin cells.

Provided are methods for X-ray analysis with respect to the in-situ coin cells.

Additional features will be set forth in part in the description which follows and, in part, will be apparent from the description, or may be learned by practice of the presented embodiments.

According to an embodiment of the present invention, an in-situ analyzed coin cell battery includes a case; a cap combined with the case; and an energy storage member between the case and the cap. A hole through which an X-ray is irradiated is defined in at least one of the case and the cap.

The hole may be defined in the case or the cap. Also, holes may be respectively defined in the case and the cap.

The energy storage member may include: a current collector disposed between the case and the cap; a cathode which contacts the current collector; an anode facing the cathode; a separator disposed between the cathode and the anode; and an electrolyte.

An elastic body may be disposed between one of the case and the cap, and the energy storage member.

One of the case and the cap may be attached to the current collector via a sealing adhesive.

The anode may include lithium.

The anode may include: a first layer including an active-material coated layer; and a second layer on the first layer. The second layer may be a current collector on which a copper thin film is disposed on an aluminum foil.

According to another embodiment of the present invention, a method of manufacturing an in-situ analyzed coin cell battery includes: preparing a case; providing an energy storage member on a horizontal part of the case; preparing a cap; and combining the cap with the case such that the cap covers the energy storage member. A hole is defined in at least one of the cap and the case.

The preparing the case may include defining the hole in the horizontal part of the case.

The preparing the cap may include defining the hole in the cap.

Holes may be respectively defined in the horizontal part of the case and the cap.

The providing the energy storage member may include: disposing a sequentially stacked current collector and a cathode between the case and the cap; disposing an anode facing the cathode; disposing a separator between the cathode and the anode; and supplying an electrolyte to the cathode.

According to another embodiment of the present invention, an in-situ X-ray analysis method for a coin cell battery includes: mounting the above-described coin cell battery in an X-ray analysis apparatus; irradiating an X-ray towards the coin cell battery via the hole defined therein; and detecting and analyzing the X-ray that reaches the coin cell battery.

BRIEF DESCRIPTION OF THE DRAWINGS

These and/or other features will become apparent and more readily appreciated from the following description of the embodiments, taken in conjunction with the accompanying drawings in which.

DETAILED DESCRIPTION

Hereinafter, embodiments of an in-situ coin cell battery which is analyzed with X-ray analysis, a method of manufacturing the in-situ coin cell, and an X-ray analysis method of the in-situ coin cell will be described in detail with reference to the accompanying drawings. In the drawings, the thicknesses of layers and regions may be exaggerated for clarity.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

First, an in-situ coin cell on which X-ray analysis is applied, according to an embodiment of the present invention, will be described.

Figure 1A:
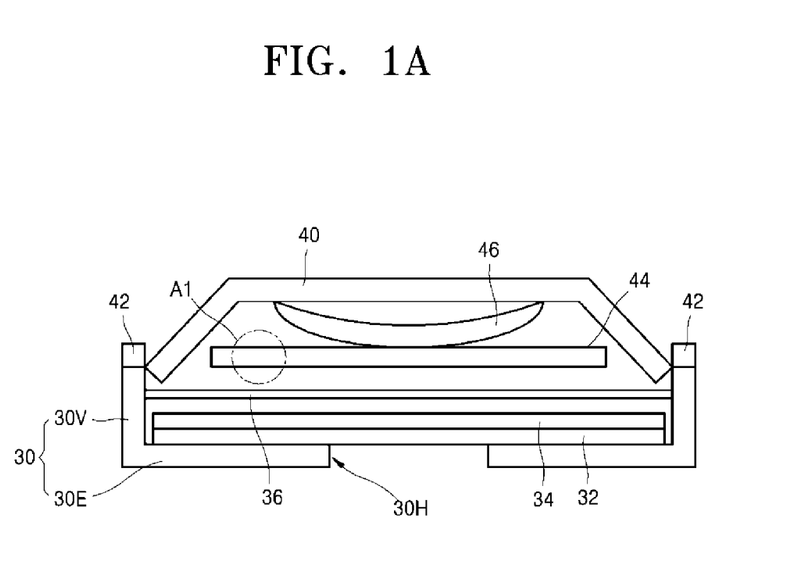
FIGS. 1A and 1B and FIGS. 2 through 4 are cross-sectional views of respective in-situ coin cells which are analyzed with X-ray analysis, according to embodiments of the present invention.
Figure 1B:
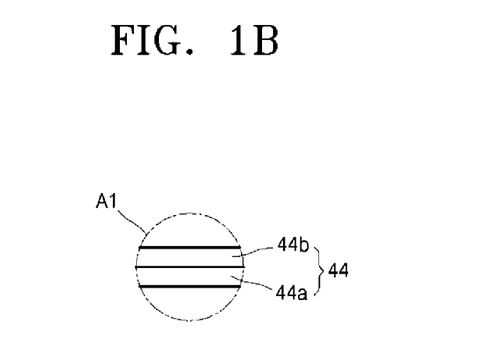

FIG. 1A is a cross-sectional view of an in-situ coin cell according to an embodiment of the present invention. FIG. 1B is an enlarged cross-sectional view of portion A1 in FIG. 1A.

Referring to FIG. 1A, a hole 30H is defined in a case 30. The hole 30H may have a diameter taken in a top plan view of the in-situ coin cell, for example, in a range from about 8 millimeters (mm) to about 10 mm. The diameter may be increased or decreased according to an X-ray irradiation atmosphere. An X-ray for performing an X-ray analysis on the in-situ coin cell may be irradiated through the hole 30H. The case 30 includes a horizontal part 30E and a vertical part 30V. The hole 30H is disposed in a region of the horizontal part 30E, such that portions of the horizontal part 30E define the hole 30H. The hole 30H may be extended completely through a cross-sectional thickness of the horizontal part 30E of the case 30.

When charging and discharging the in-situ coin cell, the X-ray is irradiated through the hole 30H and the X-ray diffracted from a cathode 34 is detected. The X-ray that is diffracted from the cathode 34 may be detected via the hole 30H. Thus, a state change of the cathode 34 may be analyzed in real-time when charging and discharging the in-situ coin cell.

A current collector 32 is disposed on the horizontal part 30E of the case 30. The current collector 32 covers (e.g., overlaps) the hole 30H. The current collector 32 and the horizontal part 30E may be attached to each other by using an adhesive. Accordingly, leakage of an electrolyte through a gap between the current collector 32 and the horizontal part 30E may be reduced or effectively prevented. The current collector 32 may include an aluminum foil. However, the current collector 32 may include another conductive film. In an embodiment, for example, a conductive film including a copper thin film deposited on an aluminum foil may be used as the other conductive film.

The cathode 34 is disposed on the current collector 32. The cathode 34 may cover an entire upper surface of the current collector 32. The cathode 34 may include an active material that includes lithium (Li), for example, $LiCoO_2$. The cathode 34 may also include an electrolyte. A separator 36 is disposed on the cathode 34. The separator 36 reduces or effectively prevents the cathode 34 from directly contacting an anode 44. The separator 36 may contact an inner surface of the vertical part 30V of the case 30.

A cap 40 is disposed on an upper side of the separator 36. If the case 30 is referred to as a lower case, the cap 40 may be referred to as an upper case. The cap 40 includes a horizontal part and a slant or inclined part. The cap 40 covers the separator 36. A gap between the cap 40 and the case 30 is sealed by a gasket 42. The gasket 42 may be an O-ring. The anode 44 is disposed between the cap 40 and the separator 36. The anode 44 may contact the separator 36.

The anode 44 may be a lithium layer. Referring to FIG. 1B, as depicted in the magnified region A1 of the anode 44, the anode 44 may have a multi-layer structure including a plurality of layers such as a first layer 44a and a second layer 44b. The first and second layers 44a and 44b contact each other.

The first layer 44a may include a material layer coated with an active material. The material layer may be, for example, a graphite layer, a silicon layer or a silicon-carbon complex layer. The second layer 44b disposed on the first layer 44a may be a current collector. The current collector may include a conductive film including a copper thin film deposited on an aluminum foil.

An elastic body 46 is disposed between the anode 44 and the cap 40. The elastic body 46 may be, for example, a spring. The cathode 34, the separator 36, the current collector 32, the electrolyte and the anode 44 may be energy storage members that store electrical energy through charging of the in-situ coin cell and may be the same members as the members included in a general coin cell.

Figure 2:
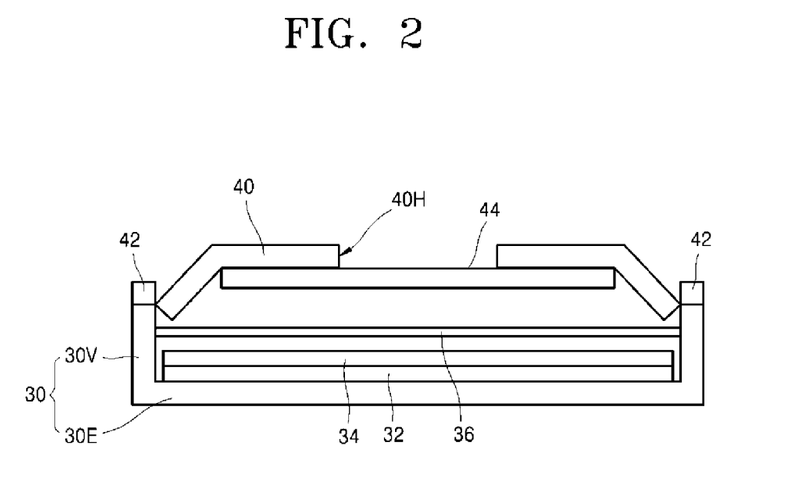

FIG. 2 is a cross-sectional view of an in-situ coin cell according to another embodiment of the present invention. Regarding FIG. 2, only descriptions of the in-situ coin cell that were not described with reference to FIGS. 1A and 1B will be presented. FIG. 2 shows an embodiment in which the hole 30H defined in the horizontal part 30E in FIG. 1A, is instead defined in the cap 40.

Referring to FIG. 2, the case 30 includes the horizontal part 30E and the vertical part 30V. A hole is not defined in the horizontal part 30E of the case 30. The hole 40H is defined in a horizontal part of the cap 40. The hole 40H may be extended completely through a cross-sectional thickness of the horizontal part of the cap 40. The hole 40H that is defined in the cap 40 is a passage through which an X-ray is irradiated, similar to the hole 30H that is defined in the case 30 of FIG. 1A.

When charging and discharging the coin cell shown in FIG. 2, an X-ray is irradiated to the anode 44 through the hole 40H, the X-ray that is diffracted from the anode 44 is detected, and thus, an electrode state of the anode 44 when charging and discharging the coin cell shown in FIG. 2 is analyzed in real-time. The X-ray that is diffracted from the anode 44 may be detected via the hole 40H.

Figure 3:
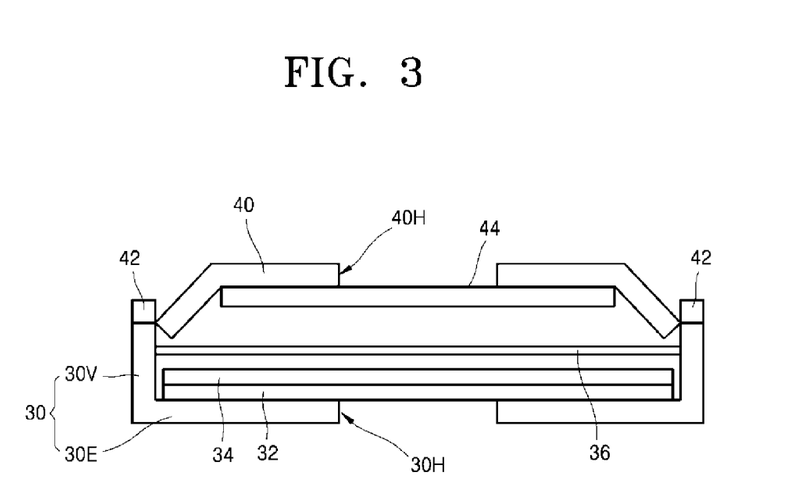

FIG. 3 is a cross-sectional view of an in-situ coin cell according to still another embodiment of the present invention. Regarding FIG. 3, only description of the in-situ coin cell that was not provided with reference to FIGS. 1A and 1B will be presented. FIG. 3 shows an embodiment where holes are defined both in the horizontal part 30E of the case 30 and in the horizontal part of the cap 40.

Referring to FIG. 3, the hole 30H is defined in the horizontal part 30E of the case 30 and the hole 40H is defined in the horizontal part of the cap 40. The in-situ coin cell of FIG. 3 corresponds to a combination of FIGS. 1A, 1B and 2. The hole 30H defined in the case 30 and the hole 40H defined in the cap 40 may be aligned to be on a same line extended in a cross-sectional view. Since the holes 30H and 40H are aligned on the same cross-sectional line, the holes 30H and 40H overlap each other in the top plan view. Since the holes 30H and 40H through which an X-ray may be irradiated and/or detected are disposed in the case 30 and the cap 40, respectively, the state change of an electrode material of the cathode 34 and/or the anode 44 may be analyzed in real-time according to charging and discharging of the coin cell shown in FIG. 3 by an X-ray being irradiated through the hole 30H of the case 30 and/or the hole 40H of the cap 40. Alternatively, the state change of an electrode material of the cathode 34 or anode 44 according to charging and discharging of the in-situ coin cell shown in FIG. 3 may be analyzed in real-time by increasing an energy of the irradiated X-ray and detecting the X-ray that penetrates from the cathode 34 to the anode 44 or from the anode 44 to the cathode 34.

Figure 4:
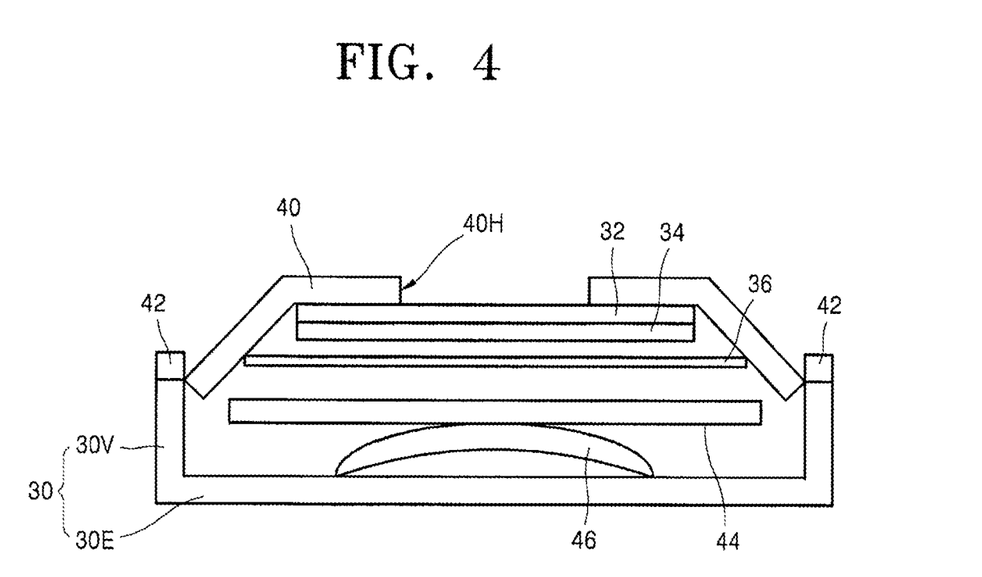

Next, FIG. 4 is a cross-sectional view of an in-situ coin cell according to yet another embodiment of the present invention. Regarding FIG. 4, only descriptions of the in-situ coin cell that were not described with reference to FIG. 2 will be presented. FIG. 4 shows an embodiment where a hole is defined in the cap 40 and the positions of members disposed between the cap 40 and the case 30 are changed.

Referring to FIG. 4, the anode 44 is disposed on the horizontal part 30E of the case 30, and the elastic body 46 is disposed between the anode 44 and the horizontal part 30E of the case 30. The separator 36 is disposed on (e.g., above) the anode 44 in the cross-sectional view, and the cathode 34 and the current collector 32 are sequentially stacked on (e.g., above) the separator 36. The current collector 32 is attached to a bottom surface of the horizontal part of the cap 40. The hole 40H defined in the cap 40 is covered by the current collector 32. The current collector 32 and the horizontal part of the cap 40 are attached to each other by using an adhesive. Accordingly, leakage of the electrolyte through a gap between the current collector 32 and the cap 40 may be prevented.

Next, a method of manufacturing an in-situ coin cell on which X-ray analysis is performed, according to an embodiment of the present invention, will now be described with reference to FIGS. 5 through 9.

Figure 5:
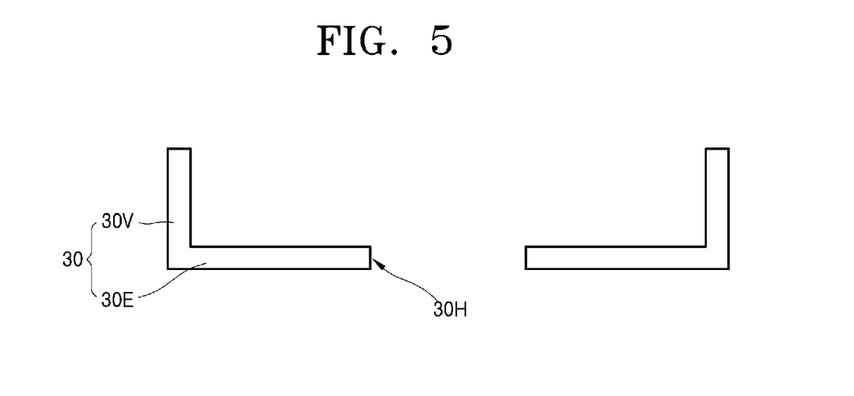
FIGS. 5 through 9 are cross-sectional views of a manufacturing method for an in-situ coin cell which is analyzed with X-ray analysis, according to an embodiment of the present invention.

Referring to FIG. 5, a case 30 for an in-situ coin cell is prepared. The case 30 includes a horizontal part 30E and a vertical part 30V, and a hole 30H is formed (e.g., provided) in the horizontal part 30E. A planar dimension, such as diameter, of the hole 30H may be appropriately controlled to irradiate an X-ray therethrough. In an embodiment, for example, the hole 30H may have a diameter taken in the top plan view in a range from about 8 mm to about 10 mm.

Figure 6:
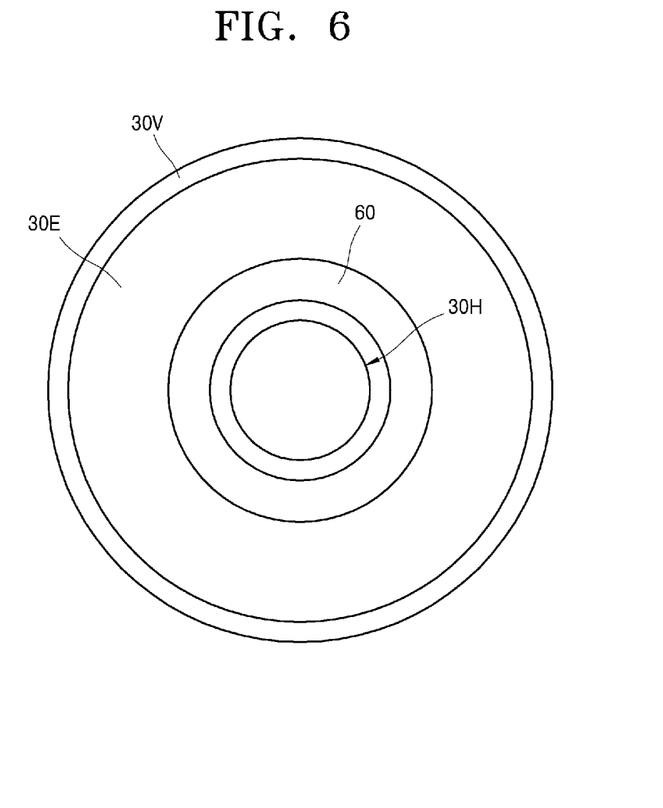

FIG. 6 is a top plan view of the case 30 of FIG. 5.

After forming the hole 30H in the horizontal part 30E of the case 30, as depicted in FIG. 6, an adhesive 60 is applied on the horizontal part 30E at a circumference of the hole 30H. The adhesive 60 may be a sealing adhesive.

Figure 7:
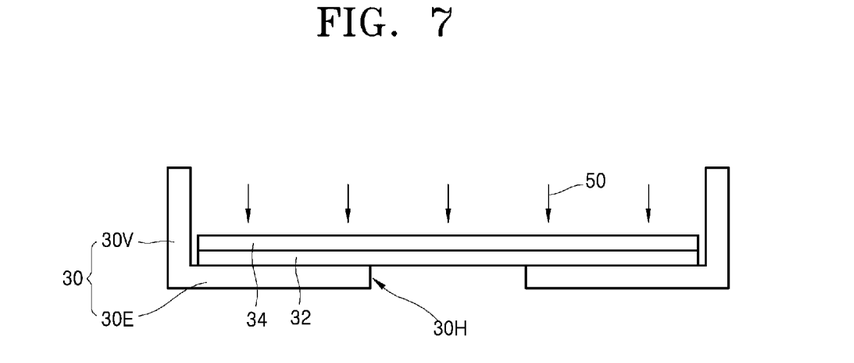

As depicted in FIG. 7, sequentially stacked current collector 32 and cathode 34 are attached to the horizontal part 30E of the case 30 on which the adhesive 60 is applied. The current collector 32 directly contacts the adhesive 60 (not shown in FIG. 7). The current collector 32 is attached to completely cover (e.g., overlap) the hole 30H. In an embodiment, the current collector 32 and the cathode 34 may be attached to the horizontal part 30E of the case 30 in a stacked state after separately stacking the current collector 32 and the cathode 34 and patterning the stack to a circular planar shape.

After attaching the current collector 32 and the cathode 34 to the horizontal part 30E of the case 30 in a stacked state, an electrolyte 50 is supplied to the cathode 34, such as indicated by the downward arrows in FIG. 7. The electrolyte 50 may be supplied to the cathode 34 by a dropping method. That is, the electrolyte 50 may be supplied to the cathode 34 by dropping droplets of the electrolyte 50 to the cathode 34. The electrolyte 50 may be supplied to the cathode 34 until the cathode 34 is sufficiently wet.

Figure 8:
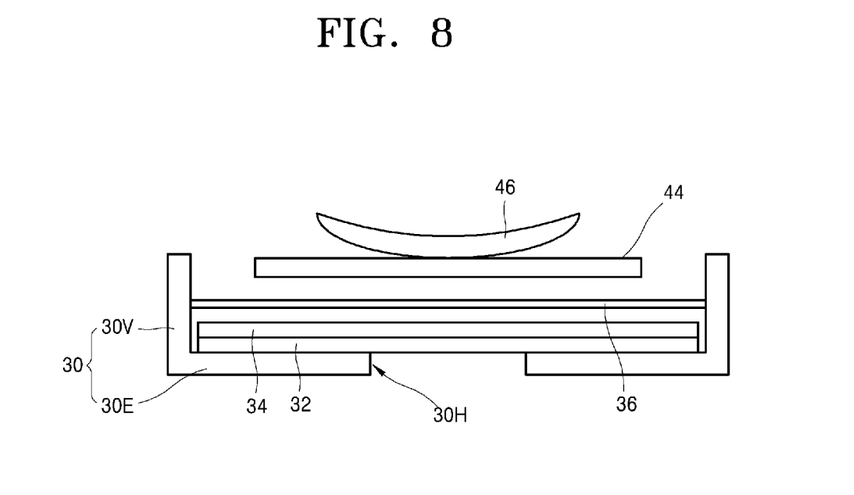

As depicted in FIG. 8, a separator 36 is disposed on the cathode 34, and an anode 44 is disposed on the separator 36. As described with reference to FIGS. 1A and 1B, the anode 44 may be formed as a single layer (e.g., a lithium layer) or as a multi-layer structure that includes the first and second layers 44a and 44b. An elastic body 46 is disposed on the anode 44.

Figure 9:
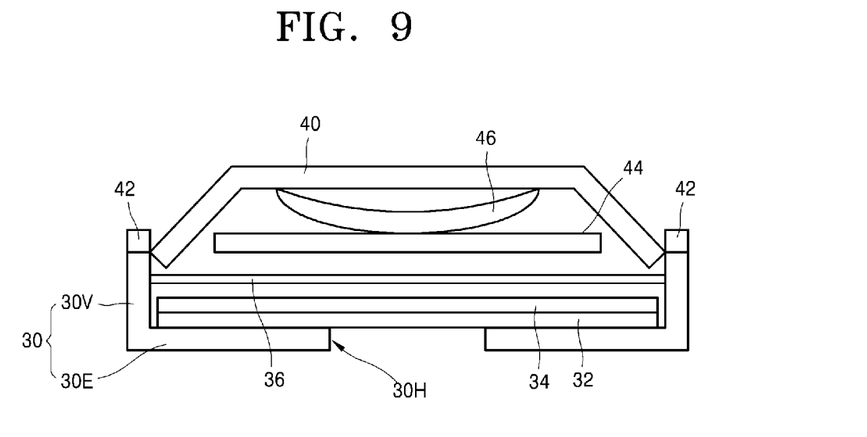

As depicted in FIG. 9, the cap 40 is combined with the case 30 to cover the elastic body 46, the anode 44 and the separator 36 disposed in the case 30. The case 30 and the cap 40 may be combined using a gasket 42 as a medium.

Alternative to the manufacturing process described above, instead of defining the hole 30H in the case 30, the hole 40H may be defined in the cap 40 and after defining the hole 40H in the cap 40 in advance, the cap 40 and the case 30 may be combined to cover the members disposed in the case 30. In still another alternative manufacturing process, the hole 30H may be defined in the case 30 and the hole 40H may be defined in the cap 40. In yet another alternative manufacturing process, when the hole 40H is defined only in the cap 40, the anode 44 and the elastic body 46 may be formed below the separator 36, and the cathode 34 and the current collector 32 may be formed above the separator 36, in the cross-sectional view.

Figure 10:
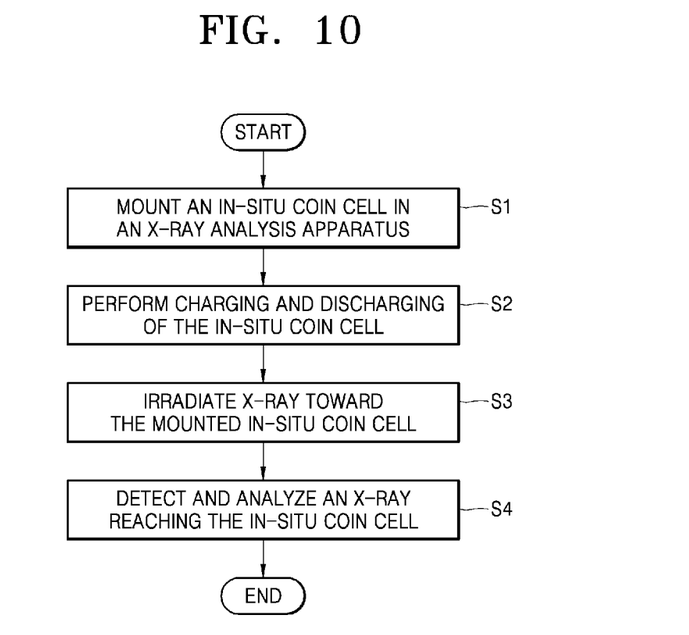
FIG. 10 is a flow chart of an X-ray analysis method for an in-situ coin cell according to an embodiment of the present invention.

Next, a method of analyzing an in-situ coin cell by using X-ray analysis according to an embodiment of the present invention will be described with reference to FIG. 10.

An in-situ coin cell provided according to one or more of the manufacturing methods described above is mounted in an X-ray analysis apparatus (S1). An operation mode of the X-ray analysis apparatus may be set to a diffraction mode or a transmission mode. In an embodiment of the present invention, the operation mode is set to a diffraction mode. A charge and discharge operation is performed with respect to the in-situ coin cell (S2). An X-ray is irradiated to the mounted in-situ coin cell (S3). In the irradiating the X-ray to the mounted in-situ coin cell, the X-ray may be irradiated to the cathode 34 or the anode 44 according to the type of the in-situ coin cell. In the following explanation of an embodiment of the present invention, the in-situ coin cell of FIGS. 1A and 1B is used. However, the in-situ coin cells of FIGS. 2 through 4 may also be used in an alternative embodiment of the present invention.

The X-ray irradiated toward the cathode 34 is diffracted by the cathode 34, and the state change of an electrode material of the cathode 34 according to charging and discharging of the in-situ coin cell is analyzed by detecting the diffracted X-ray (S4). The X-ray that is diffracted from the cathode 34 may be detected via the hole. When the energy of the irradiated X-ray is relatively high, the X-ray may pass completely through the cathode 34.

Figure 11:
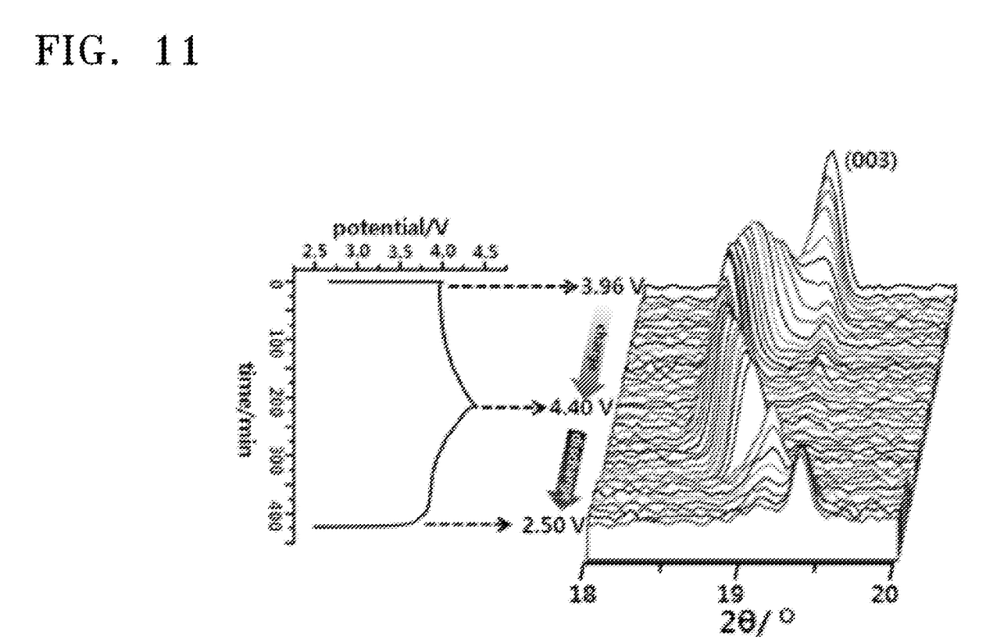
FIG. 11 includes views showing an X-ray diffraction result as a result of X-ray analysis with respect to an in-situ coin cell which is analyzed with the X-ray analysis, according to an embodiment of the present invention.

FIG. 11 includes views showing a result of analyzing an X-ray diffracted in the cathode 34. In the left side graph of FIG. 11, a horizontal axis indicates a voltage change in potential as a function of volts (V) of an in-situ coin cell according to charging and discharging thereof, and a vertical axis indicates a charging and discharging time in minutes (min). In the right side graph of FIG. 11, a horizontal axis indicates an X-ray diffraction peak in angle (θ) per degree) (°. The right side graph of FIG. 11 shows an X-ray diffraction peak graph that provides information about the state change of an electrode material ($LiCoO_2$) according to charging and discharging of the in-situ coin cell.

Referring to FIG. 11, it is seen that the X-ray diffraction peak is changed in real time at charging of the in-situ coin cell from 3.96 V to 4.40 V and at discharging in-situ coin cell from 4.40 V to 2.50 V. Based on the change of the X-ray diffraction peak, a change of the state, for example, the crystallinity of an electrode material of the cathode 34, may be observed during charging and discharging of the in-situ coin cell.

One or more embodiment of an in-situ coin cell on which X-ray analysis is performed, according to the present invention does not include an X-ray window material (for example, beryllium or polyimide film) that is included in an in-situ coin cell of the related art. Accordingly, reduction of X-ray intensity due to the X-ray window material and reduction of sensitivity in sensing an X-ray during X-ray analysis may be reduced or effectively prevented.

Also, the in-situ coin cell according to the embodiments of the present invention uses the same basic electrode structure, pressure, electrolyte and the quantity of the electrolyte as that of an in-situ coin cell of the related art. Accordingly, the X-ray analysis result may have relatively high reliability and thus can be directly applied to a coin cell that is actually used.

Also, in the in-situ coin cell according to the embodiments of the present invention, a hole may be simply formed by perforating a case and/or the cap of the in-situ coin cell, and thus, the method of manufacturing the in-situ coin cell is simple when compared to the method of manufacturing an in-situ coin cell of the related art.

It should be understood that the embodiments described herein should be considered in a descriptive sense only and not for purposes of limitation. Descriptions of features within each embodiment should typically be considered as available for other similar features in other embodiments.

While one or more embodiments of the present invention has been described with reference to the figures, it will be understood by those of ordinary skill in the art that various changes in form and details may be made therein without departing from the spirit and scope of the present invention as defined by the following claims.

What is claimed is:

1. An in-situ X-ray analyzed coin cell battery comprising:
   a case;
   a cap combined with the case; and
   an energy storage member comprising at least an anode which is provided between the case and the cap, a current collector and an electrolyte, wherein
a hole through which an X-ray is irradiated to the anode is defined in at least one of the case and the cap, the hole exposing the anode to outside the case and the cap,
the X-ray irradiated to the anode through the hole exposing the anode to outside the case and the cap, is directly applied to the anode without passing through an element, and
one of the case and the cap is attached to the current collector via a sealing adhesive therebetween to seal the current collector and the one of the case and the cap.

2. The in-situ X-ray analyzed coin cell battery of claim 1, wherein the hole is defined in the case.

3. The in-situ X-ray analyzed coin cell battery of claim 1, wherein the hole is defined in the cap.

4. The in-situ X-ray analyzed coin cell battery of claim 1, wherein the hole is defined in both the case and the cap.

5. The in-situ X-ray analyzed coin cell battery of claim 1, wherein the energy storage member further comprises between the case and the cap:
the current collector;
a cathode which contacts the current collector;
the anode facing the cathode;
a separator between the cathode and the anode; and
the electrolyte.

6. The in-situ X-ray analyzed coin cell battery of claim 5, wherein
the current collector is attached to a lower surface of the cap, and
the anode is disposed closer to the case than the current collector in a cross-sectional direction.

7. The in-situ X-ray analyzed coin cell battery of claim 1, wherein an elastic body is between the energy storage member and the case or between the energy storage member and the cap.

8. The in-situ X-ray analyzed coin cell battery of claim 5, wherein the anode comprises a lithium layer.

9. The in-situ X-ray analyzed coin cell battery of claim 5, wherein the anode comprises:
a first layer comprising an active material-coated layer; and
a second layer on the first layer,
wherein the second layer is the current collector including a copper thin film on an aluminum foil.

* * * * *